United States Patent
Schiccheri et al.

(10) Patent No.: US 10,436,408 B2
(45) Date of Patent: Oct. 8, 2019

(54) LIGHTING DEVICE, CORRESPONDING LAMP AND METHOD

(71) Applicant: OSRAM GmbH, Munich (DE)

(72) Inventors: Nicola Schiccheri, Padua (IT); Alessandro Bizzotto, Castelfranco Veneto (IT); Marco Munarin, Paese (IT)

(73) Assignee: OSRAM GMBH, Munich (DE)

( * ) Notice: Subject to any disclaimer, the term of this patent is extended or adjusted under 35 U.S.C. 154(b) by 95 days.

(21) Appl. No.: 15/859,793

(22) Filed: Jan. 2, 2018

(65) Prior Publication Data
US 2018/0187853 A1   Jul. 5, 2018

(30) Foreign Application Priority Data
Jan. 3, 2017   (IT) .................. 102017000000425

(51) Int. Cl.
*F21V 13/04*   (2006.01)
*F21S 41/32*   (2018.01)
(Continued)

(52) U.S. Cl.
CPC .......... *F21S 41/322* (2018.01); *F21S 41/143* (2018.01); *F21S 41/285* (2018.01); *F21S 41/321* (2018.01); *F21S 41/435* (2018.01); *F21V 5/04* (2013.01); *F21V 7/0091* (2013.01); *F21V 7/08* (2013.01); *F21V 13/04* (2013.01); *G02B 19/0028* (2013.01); *F21K 9/232* (2016.08);
(Continued)

(58) Field of Classification Search
CPC .................. F21S 41/321–322; F21V 13/04
USPC .......................................................... 362/561
See application file for complete search history.

(56) References Cited

U.S. PATENT DOCUMENTS 8,616,733 B1   12/2013 Millikan
2006/0028834 A1   2/2006 Miller et al.
(Continued)

FOREIGN PATENT DOCUMENTS

DE   102011051541 A1   1/2013
DE   102015201300 A1   7/2016
(Continued)

OTHER PUBLICATIONS

Italian Search Report based on application No. 2017000000425 (8 pages) dated Sep. 21, 2017 (for reference purpose only).

*Primary Examiner* — Toan C Ly

(57) ABSTRACT

A lighting device, which may be employed e.g. as a retrofit bulb for vehicle lamps, includes a light radiation source, e.g. a LED source, and a beam-narrowing optical system facing the light radiation source, for propagating a narrowed light radiation beam of the same source along a longitudinal axis of the device. Arranged distally of the beam-narrowing optical system along said longitudinal axis, there is moreover provided a cascaded arrangement of: a light-condensing lens, a light-driving lens, a filament-like body including annular reflective surfaces extending around the longitudinal axis and exposed to light radiation from the light radiation source propagated through the light-condensing lens and the light-driving lens, a distal mirror member having a reflective surface facing towards the filament-like body, to reflect light radiation towards annular reflective surfaces in said plurality of annular reflective surfaces.

13 Claims, 2 Drawing Sheets

(51) Int. Cl.

| | | |
|---|---|---|
| *F21S 41/143* | (2018.01) | |
| *F21S 41/20* | (2018.01) | |
| *F21S 41/43* | (2018.01) | |
| *F21V 5/04* | (2006.01) | |
| *F21V 7/00* | (2006.01) | |
| *F21V 7/08* | (2006.01) | |
| *G02B 19/00* | (2006.01) | |
| *F21K 9/232* | (2016.01) | |
| *F21Y 115/10* | (2016.01) | |
| *F21K 9/69* | (2016.01) | |
| *F21K 9/68* | (2016.01) | |
| *F21W 102/00* | (2018.01) | |

(52) U.S. Cl.
CPC ...... *F21K 9/68* (2016.08); *F21K 9/69* (2016.08); *F21W 2102/00* (2018.01); *F21Y 2115/10* (2016.08)

(56) References Cited

U.S. PATENT DOCUMENTS

| | | |
|---|---|---|
| 2009/0052189 A1 | 2/2009 | Kon |
| 2010/0208488 A1 | 8/2010 | Luo |
| 2011/0267835 A1 | 11/2011 | Boonekamp et al. |
| 2015/0036357 A1 | 2/2015 | Man |
| 2015/0055364 A1* | 2/2015 | Kosugi ............... F21S 45/48 362/551 |
| 2015/0247615 A1 | 9/2015 | Matsui |
| 2016/0010829 A1 | 1/2016 | Gielen et al. |
| 2016/0215959 A1 | 7/2016 | Rehn |
| 2016/0341389 A1* | 11/2016 | Hoshino ............... F21S 41/14 |
| 2017/0211770 A1* | 7/2017 | Schmidt ............... F21S 41/192 |
| 2017/0356616 A1 | 12/2017 | Schiccheri et al. |

FOREIGN PATENT DOCUMENTS

| | | |
|---|---|---|
| FR | 2799269 A | 4/2001 |
| GB | 2489384 A | 9/2012 |
| JP | 2011023299 A | 2/2011 |
| WO | 03060580 A1 | 7/2003 |
| WO | 2016158542 A1 | 10/2016 |

* cited by examiner

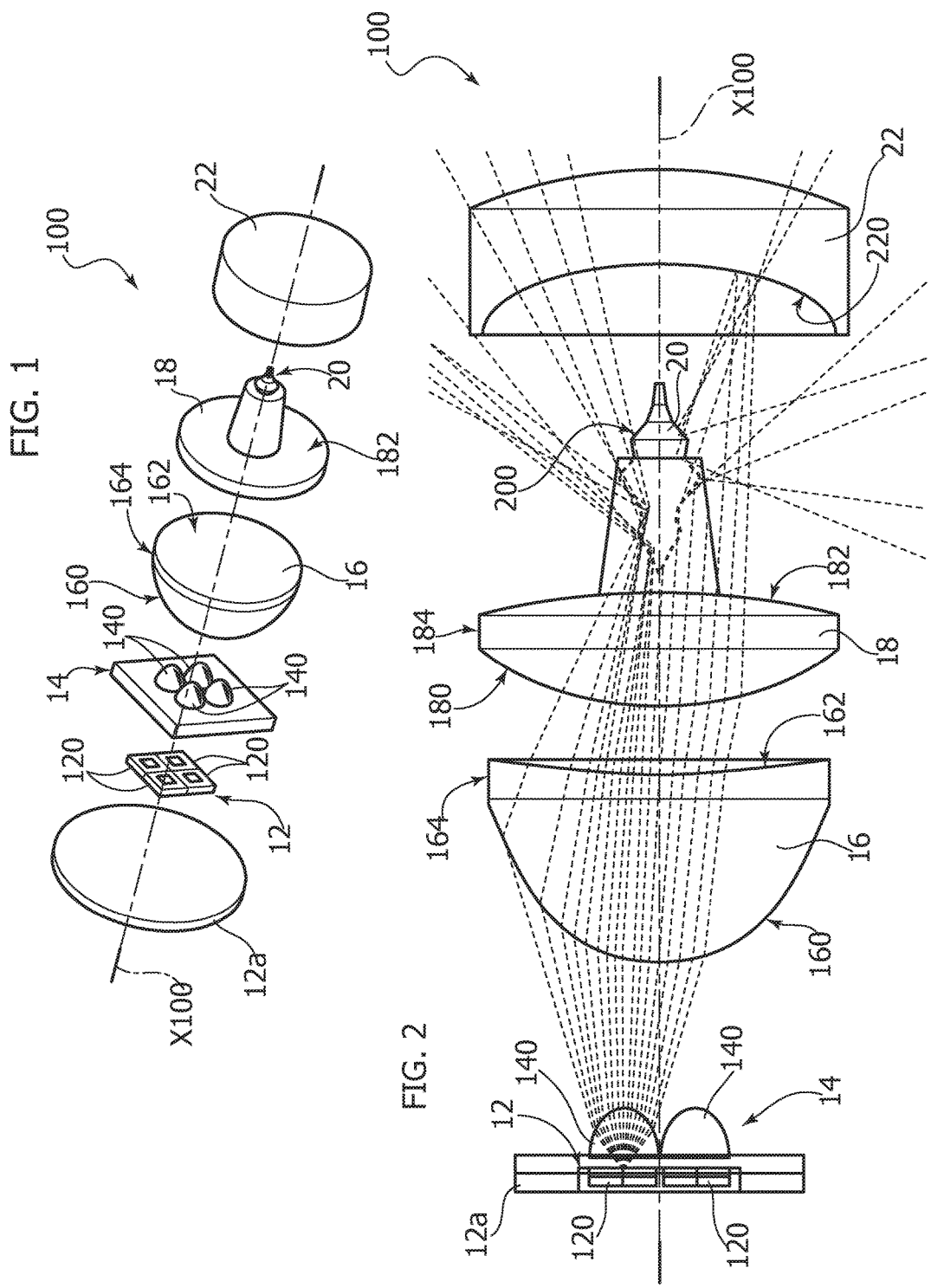

LIGHTING DEVICE, CORRESPONDING LAMP AND METHOD

CROSS-REFERENCE TO RELATED APPLICATION

This application claims priority to Italian Patent Application Serial No. 102017000000425, which was filed on Jan. 3, 2017, and is incorporated herein by reference in its entirety.

TECHNICAL FIELD

The present description relates to lighting devices. One or more embodiments may refer to lighting devices including electrically-powered light radiation sources, e.g. solid-state light radiation sources such as LED sources, which may be used e.g. in the automotive field.

BACKGROUND

The lamps or bulbs for retrofit applications are enjoying a growing popularity as possible replacements of halogen sources in motor vehicle headlamps, e.g. in the aftermarket business.

Various lamps or bulbs employ LEDs as light radiation sources. This is due to the consolidation of SSL (Solid State Lighting) technology and to the advantages inherent in LED light radiation sources, e.g. a long service life, low power absorption, the different Correlated Colour Temperatures (CCTs), leading e.g. to the achievement of a cooler white light than the light emitted by halogen bulbs.

The lamps for the automotive sector (such as e.g. the headlamps of a motor vehicle) may include photometrical functions that are particularly important for the safety of the driver and of other road users. The international organizations have therefore defined the characteristics which must be present in the beam emitted by such lamps, e.g. in terms of shape and luminous intensity.

One of the purposes of the developers of such lamps is to design the optical system (e.g. a reflector in the case of traditional halogen light sources) adapted to project the image of the bulb filament towards the road. The size and the position of the filament and the flux emitted by the lamp or bulb are crucial parameters in the design of the reflector, e.g. for low beam and high beam headlamps. Small variations of these parameters are adapted to affect the lamp functionality, possibly leading to a failure to comply with the specifications defined in the international regulations.

However, the introduction of LED light radiation sources for lamps or bulbs, e.g. for retrofit applications, involves difficulties in reproducing the emission, e.g. the light emitting volume, of a traditional filament.

Presently, the most common retrofit lamps or bulbs based on LED sources may include an array of two or more LEDs arranged on two substrates (e.g. Printed Circuit Boards, PCB), which are assembled with the planar faces parallel to each other, so as to facilitate the emission of the LED light radiation in opposite directions.

This layout, however, may not ensure that the lamp (e.g. a high beam/low beam headlamp) is compliant with regulations, e.g. because the achievable light emitting volume fails to reproduce the light emitting volume of a traditional filament, and therefore the light is emitted with a radiation pattern which is not symmetrical around the bulb axis.

WO 2016/158542 A1 describes a light source facing a lens, as well as a reflector having cylindrical symmetry around an optical axis. The lens changes the direction of the light from the light source, and deflects the beam towards the reflector.

U.S. 2016/0010829 A1 describes an optical arrangement including a cup-shaped reflector, a light source and a lens facing the source, the reflector and the light being formed together.

U.S. 2016/0215959 A1, which claims the priority of German Application DE 10 2015 201 300.6, describes a lighting device including a light source, an ellipsoidal reflector, an aspheric lens and an exit pupil as output of the lighting device. The aspheric lens is arranged between the ellipsoidal reflector and the exit pupil, and it is shaped in such a way that a part of the reflected light passes through the lens with an aperture angle not wider than 5°. Another part of the reflected light enters the aspheric lens in an outer region, and is driven towards the emission pupil.

FR 2 799 269 A describes a method for modifying the light distribution of a source the image whereof is projected by a lens passing through a light transmitting element, including a plurality of plates.

U.S. 2015/0247615 A1 describes an extruded optical system for a UV device, wherein the light emitted by a rod-shaped, solid-state light radiation source is collected by an elongated elliptical reflective mirror and is condensed by a lens acting as output element.

U.S. 2006/0028834 A1 describes a projection system including a light source, an ellipsoidal reflector, an elongated transparent glass rod and a collimating lens, spaced in the distal direction from the end of the rod. All the components of the optical system are coaxial with the optical axis.

U.S. 2015/036357 A1 describes a reflector assembly for eliminating stray light and including a reflector, having a focal point where at a light source is arranged, and a facing lens configured to reflect the rays backwards to the light source.

GB 2 489 384 A describes a rod having light reflecting properties and arranged on a shaft. The outer surface of the rod is irregular and includes a plurality of faces having a variety of different shapes and sizes. The reflective surfaces are formed by a coating of light reflective material.

WO 03/060580 A1 describes a lighting device including a light transparent rod, having a light source located at one end of the rod, with a linear reflector extending longitudinally of the rod.

Italian Patent Application 102016000059954 (corresponding to the U.S. patent application Ser. No. 15/250,988) describes a lighting device including a solid-state source and a light permeable body, which collimates and directs the light towards a distal portion including a mirror, so as to emulate the emission of a filament.

SUMMARY

Despite the extensive research in the field, the need is still felt of lighting devices, e.g. for the applications mentioned in the foregoing, which exhibit improved properties both as regards efficiency and as regards the achievement of an emission light pattern similar to the pattern emitted by a filament.

One or more embodiments aim at contributing to meeting such need.

According to one or more embodiments, said object may be achieved thanks to a lighting device having the features set forth in the claims that follow.

One or more embodiments may also concern a corresponding lamp (e.g. a reflector for motor vehicles) as well as a corresponding method.

The claims are an integral part of the technical teaching provided herein with reference to one or more embodiments.

One or more embodiments may offer the advantage of reproducing an emission similar to a halogen lamp, thanks to a prismed structure of a filament-like body.

In one or more embodiments, a distal concave mirror may focus the light in the area where said filament-like body is arranged, so as to contribute to driving the light radiation of the device from the area of the body.

In one or more embodiments, the luminance of the light emitting volume of the device may meet the regulations both in terms of size and in terms of homogeneity.

In one or more embodiments, the manufacturing of the device may include overmoulding the distal lens around the filament-like body having a prismed configuration.

In one or more embodiments it is possible to take into account possible shifts of the position of the filament-like body from the nominal position (adapted to influence the shape of the beam emitted by the device) e.g. by regulating the position of one of the optical elements arranged along the optical axis of the device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a lighting device according to one or more embodiments, shown in exploded view;

FIG. 2 shows a lighting device according to one or more embodiments, shown in longitudinal section.

DESCRIPTION

Figure 3:
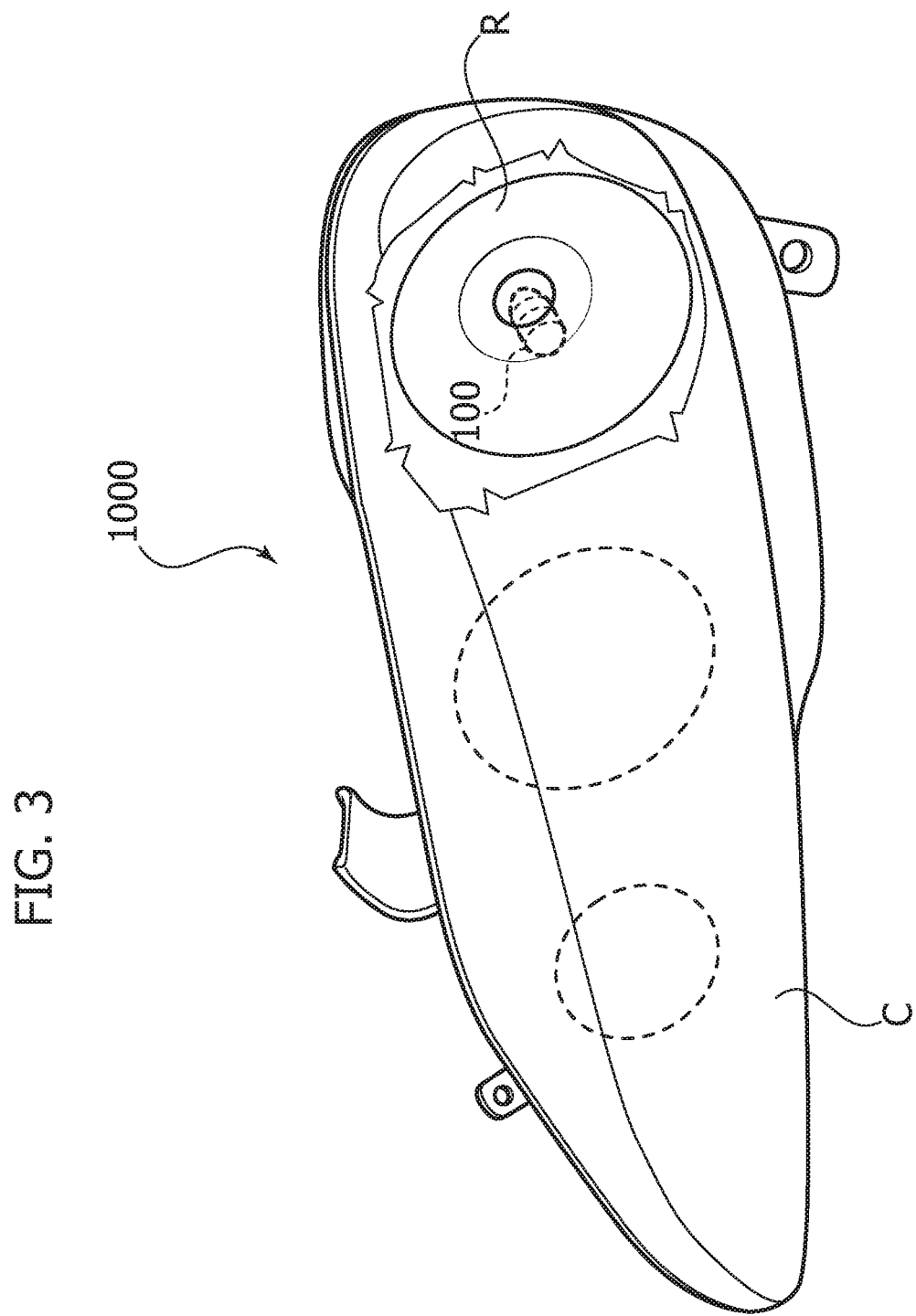
FIG. 3 shows an example of a lamp of a vehicle adapted to include a device as exemplified in FIGS. 1 and 2.

In the following description, one or more specific details are given to provide a thorough understanding of the exemplary embodiments according to the present description. The embodiments may be practiced without one or several specific details, or with other methods, components, materials, etc. In other instances, well-known structures, materials, or operations are not shown or described in detail in order to avoid obscuring various aspects of the embodiments.

Reference throughout this specification to "one embodiment" or "an embodiment" means that a particular feature, structure, or characteristic described in connection with the embodiment is included in at least one embodiment. Thus, the possible appearances of the phrases "in one embodiment" or "in an embodiment" in various places throughout this specification are not necessarily all referring to the same embodiment. Furthermore, particular features, structures, or characteristics may be combined in any suitable manner in one or more embodiments.

The headings provided herein are for convenience only, and therefore do not interpret the extent of protection or scope of the embodiments.

One or more embodiments may refer to a lighting device 100 employing electrically-powered light radiation sources, such as solid-state light radiation sources (e.g. LED sources).

One or more embodiments may aim at reproducing the radiation pattern of an e.g. halogen lighting device ("bulb") as used e.g. for implementing vehicle lamps.

In one or more embodiments, the light emission of device 100 may be included in an angular range defined by cut-off angles, and may have a cylindrical symmetry around the axis of the device, denoted as X100.

Compared to the solutions described in the Italian Patent Application 102016000059954 (U.S. Ser. No. 15/250,988), already mentioned in the foregoing, one or more embodiments may aim at reducing the intensity of the peaks of the light frontward, so as to increase the overall efficiency of the device. These peaks may correspond to a fraction of stray light: although they contribute to the total efficiency of the system, there is a risk that such peaks may not be collected by the light reflector whereon device 100 may be mounted, such a reflector being therefore unable to collect and manage such peaks. As a result, such peaks may remain unused for shaping the generated optical beam.

In short, the device according to the above mentioned Application includes a light transmitting body which is adapted to collimate and drive the light towards a cylindrical distal portion which has a size similar to the filament of halogen lamps, the collimating lens acting to condense the light of the LED source in the cylindrical distal portion.

It was observed that, in some cases, when a high flux is required from the device, the light emitting area of the LEDs may be much larger than the area of the base circle of the cylindrical distal portion. This may lead to losses linked to the &endue of the system: the light which cannot reach the cylindrical distal portion exits the collimator through the lateral walls, originating the previously described light peaks.

It has been ascertained that an analysis of the scope may suggest some countermeasures adapted to reduce the losses and increase the efficiency of the device.

For example, the size of the cylindrical distal portion may be increased, and/or the emitting area of the LED sources may be reduced. The former solution is hardly feasible, because the size of the distal portion is supposed to be as similar to the size of a filament as possible. Moreover, the emitting area of the LEDs may be constrained by technological needs, in particular by the need of matching the emitting area and the outcoming flux.

Another possible solution involves decreasing the angular divergence of the light beam emitted by the LEDs, considering that the LED emission typically follows a lambertian profile, so that the angular divergence may be reduced e.g. by coupling a lens directly on the LED package or facing the same.

Another option may consist in the choice of the materials, e.g. by selecting materials having a high refractive index.

Finally, a further possible intervention regards the target of the system. Traditionally, the light emitted by the light source was directed towards the base of the cylindrical distal portion, which may include an output mirror with a spindle portion extending in the distal portion. The purpose of such output mirror is to radially spread the light onto the lateral surface of the distal portion.

Another layout may be envisaged which involves driving a part of the light from the light radiation source towards the lateral surfaces of the output mirror, through the lateral surface of the cylindrical distal portion, without passing through the base of the cylindrical distal portion.

This change may be advantageous in improving the scope, by increasing the surface of the target whereon the beam impinges, a further advantage consisting in the possibility of using rays which are more tilted with respect to the optical axis.

In one or more embodiments, a device 100 as exemplified herein may include an electrically-powered light radiation source 12, such as a solid-state, e.g. LED, source.

In one or more embodiments, source 12 may be mounted on a substrate 12a, such as a circular base. However, such a shape is by no way mandatory, because other shapes may be chosen, e.g. as a function of the application and usage needs.

In one or more embodiments, source 12 (in the following, for the sake of brevity, reference will be mainly made to a LED source) is adapted to emit light radiation, e.g. in the blue range, and has a phosphors coating associated thereto for converting the blue radiation into yellow light, in order to obtain white outgoing light emission.

In one or more embodiments, source 12 may be single or may include a plurality of sources, with one or more light emitting surfaces, e.g. with one or more chips.

For example, in one or more embodiments various LED packages may be used, such as e.g. a package having a single Light Emitting Surface (LES) and/or at least one chip under the phosphors cover.

One or more embodiments may envisage packages including two or more light emitting surfaces corresponding e.g. to two or more chips, either having a corresponding phosphors cover each or having a common cover.

In one or more embodiments, an array of single LEDs may be used, having a single light emitting surface per package.

In one or more embodiments, the LEDs may be arranged so as to obtain a dense packaging.

One or more embodiments as exemplified herein may resort e.g. to a square array of four LEDs 120, having a respective light emitting surface for each LED.

This choice is by no way to be construed in a limiting sense: indeed, one or more embodiments may adopt different layouts, both as regards the number of light emitting surfaces and as regards the distribution thereof. This choice may be made according to the application and usage needs, e.g. as a function of factors such as the emitted luminous flux, the symmetry of the system, the scope and/or the manufacturing technology of the light radiation emitters, e.g. the LEDs.

In one or more embodiments, an optical system 14 may be coupled to the source 12.

In one or more embodiments, said optical system includes a lens system, which may be arranged facing light source 12, e.g. in order to narrow the light radiation beam emitted by source 12, reducing "de facto" the angular divergence of the beam.

One or more embodiments as exemplified herein, which envisage the possible presence of four LEDs 120, may provide a corresponding array including four lenses 140, each lens 140 being coupled to a respective LED 120.

In one or more embodiments, of course, the lenses 140 may have a different arrangement, corresponding to the layout chosen for the LEDs 120.

In one or more embodiments, the lens or lenses 140 may be planar-convex, the planar face thereof facing the light emitting surface of the respective LEDs, and a convex (e.g. aspheric) surface facing the side opposite light source 12.

In one or more embodiments, the design of the convex (e.g. aspheric) profile may contribute to obtaining an outgoing light radiation beam having a FWHM value of +/−10°, and/or may provide a focal point in the region of (e.g. at or near) the light radiation emitting surface of the respective LED 120.

In one or more embodiments it is possible to select other values of the divergence angle, e.g. according to the total length and the lateral dimensions of device 100.

In one or more embodiments, the lenses 40 may be either separated from each other or connected with each other, so as to facilitate the fixation thereof.

In one or more embodiments, for the implementation of the lens or lenses 140 it is possible to make use of a material such as highly transparent silicone.

In one or more embodiments, other possible materials are polymethyl methacrylate (PMMA), polycarbonate (PC), glass or the like.

In one or more embodiments as exemplified herein, a clearance or air gap may be left between the light radiation source 12 and the optical system 14.

Said clearance or gap may be useful to make the surface of the lens or lenses facing the light radiation source optically active, while avoiding possible damages on the LED package.

Another possible advantage due to the presence of said gap concerns the interaction with the surface cover of the LEDs. The LED phosphors may be dispersed in a (e.g. silicone) matrix which is the extremal part of the LED cover. This matrix has a refractive index similar to the material of the optical system 14 (e.g. silicone). The presence of the gap may cause the rays emitted by the light radiation source 12 to interact appropriately with the molecules of the phosphors, as designed in the LED production.

In one or more embodiments, the optical system 14 may be applied directly onto the package of the light radiation source 12.

Irrespective of the specific implementation details, in one or more embodiments, thanks e.g. to the optical system 14, a narrow or narrowed light radiation beam may be obtained from the source 12.

In one or more embodiments, in a distal position from the optical system 14 (i.e. downstream the same in the propagation direction of the light radiation from source 12, from left to right in FIGS. 1 and 2) there may be arranged a light-condensing lens 16, e.g. an aspheric lens.

In one or more embodiments, lens 16 may be an optical component adapted to be interposed between the optical system 14, facing the light radiation source, and a further light-driving lens 18 (arranged further distally) which will be discussed in the following.

In one or more embodiments, lens 16 may include a first surface 160 (e.g. an aspheric surface) facing the light radiation source 12, and a second surface 162 (e.g. an aspheric surface) facing away from source 12.

Both surfaces 160 and 162 may be connected to each other by means of an edge cylindrical surface 164, adapted to be used for fixing lens 16 when assembling device 100.

In one or more embodiments, lens 16 may have the function to condense (collect) the light radiation of the beam from source 12, which has been narrowed by optical system 14, so as to direct the light radiation onto the surfaces of a filament-like body 20 and/or towards a distal mirror 22, both of which will be discussed in the following.

In one or more embodiments, surfaces 160 and 162 may have a concave and respectively a convex facing profile, e.g. the surface 160 having a convexity facing towards the light radiation source 12 and the optical system 14, and the surface 162 having a concavity facing towards lens 18: in this respect, see the view of FIG. 2.

In one or more embodiments, surfaces 160 and 162 may be described by a polynomial equation e.g. of the 12th order.

In one or more embodiments, other profiles may be used e.g. according to the &endue of the system, to the divergence of the beam entering the lens 16, to the maximum lateral dimension allowed and/or to the total length of device 100.

In one or more embodiments as exemplified herein, each radiation emitter (e.g. LED) 120 may be at least slightly offset from the optical axis X100 of device 100, and may face a respective portion of the lens 16.

For example, in the presently exemplified embodiment, wherein the light radiation source 12 includes four LEDs in a square array, each LED 120 faces a portion of the lens 16 amounting to a quarter of the aspheric lens 16.

The light beam impinging on the portion of the lens 16 arranged in front of a given emitter 120 is focused and driven towards the lateral surface of the filament-like body 20 described in the following. The part of the beam emitted by the emitter 120 which impinges onto the other portions of lens 16 is directed towards the distal mirror 22.

In one or more embodiments, the lens 16 may include a light-permeable material such as glass, plastic or silicone.

In one or more embodiments, device 100 may also include a further lens 18 arranged distally of source 12, i.e. the lens 16 being interposed between the lens 18 and the source 12 (and the optical system 14).

The lens 18 may include, in one or more embodiments, three surfaces 180, 182, 184.

A first surface 180, facing in a proximal direction, i.e. towards the light radiation source 12, may be convex with an aspheric profile, the possibility being given in one or more embodiments of using a spherical profile. In one or more embodiments, the surface 180 may have the purpose of driving the light, incoming from the light radiation source 12 (and from the optical system 14) and "condensed" by lens 16, towards the output surface 182, which may be tapered, e.g. having the shape of a truncated cone.

Surface 182 may perform, in one or more embodiments, two functions: a mechanical function of supporting the filament-like body 20 discussed in the following, and an optical function of driving the light radiation, the rays whereof are slightly inclined with respect to the optical axis X100, towards the filament-like body 20, e.g. by means of total internal reflection.

The surfaces 180 and 182 may be connected by an edge surface 184, adapted to be used in assembling the device 100.

In one or more embodiments, the lens 18 may include a light-permeable material, e.g. a transparent material such as silicone, thermoplastic material or glass.

It will be appreciated, however, that for the implementation of the various optical systems/components exemplified herein it is possible to use either one material or different materials: for example, the material of lens 18 may be different from the material of the lens or lenses of the optical system 14, and the use of multiple lenses may offer the advantage of managing chromatic aberrations by using different materials in the manufacturing of lenses.

In one or more embodiments, device 100 may moreover include, supported by lens 18 (and anyway mounted distally of lenses 16 and 18, and therefore on the opposite side with respect to the light radiation source 12 with reference to the lenses 16 and 18) a filament-like body 20 having the features of a prism.

In one or more embodiments, the body may be a spindle-shaped reflective body, with the function of widening and/or spreading the light radiation around axis X100 in an angular range of e.g. 40° (frontward) to 140° (backward) with respect to axis X100.

This is schematically shown by the paths of the optical rays exemplified in FIG. 2.

In one or more embodiments, body 20 may be considered as obtained by the revolution, around axis X100, of a complex profile including a sequence of tapered reflecting sources 200, which for example may be connected with each other so as to define (in an ideal diametral section of body 20) a broken line denoted as 200 in FIG. 2.

The direction and the magnitude of the inclination of said surfaces (which may also be present in a large number, e.g. 5, 6 or 7 or more) may be determined so as to achieve a spreading or widening of the light radiation in a desired angular range, without originating peaks or leaks in the light distribution.

In one or more embodiments, the number of the inclined surfaces 200 of the filament-like body 20 may be high and dependent on the desired segmentation. The segmentation factor, i.e. the width of the inclined surfaces versus the length of the body, may be defined by considering the number of surfaces which are to be inserted and managed, and their feasibility. A high number of surfaces leads to a higher degree of freedom in managing the light, therefore increasing the angular homogeneity of the radiation emitted by the lamp. On the other hand, a high number of surfaces implies having surfaces with a small area, which may require a certain care in manufacturing body 20.

In one or more embodiments, surfaces 2000 may be concave or convex, in order to better manage the angular range of the light reflected by the surfaces.

In one or more embodiments, the body 20 may therefore be considered as composed of a sequence of reflecting prisms having a ring-like or annular shape. In one or more embodiments, the body 20 may include a metal or plastic material having properties of specular and/or diffusive reflectivity.

In one or more embodiments, body 20 may be partly included in the (secondary) lens 18 and partly located outside the same, as visible in the Figures.

In one or more embodiments, body 20 may be coupled to lens 18 e.g. by overmoulding lens 18 around body 20; this may be accomplished e.g. according to the criteria applicable to the manufacturing of a silicone or thermoplastic lens 18.

If said overmoulding is not easily feasible (e.g. if lens 18 is a glass lens), in one or more embodiments body 20 may be glued onto lens 18.

Whatever the solution adopted for mounting body 20, in one or more embodiments body 20 (having an overall spindle-like shape) may be arranged with its axis extending along the light radiation propagation path (axis X100), the light radiation outcoming from lens 18 being adapted to impinge and reflect on the surfaces 200 of body 20, optionally propagating through the light-permeable material, which helps mounting body 20 into device 100, e.g. onto lens 18.

One or more embodiment may include, as "output" component of device 100, a mirror 22 which is arranged at a (further) distal position from body 20, and which is adapted to be configured, in one or more embodiments, as a mirror having a concave reflective surface 220 facing proximally, i.e. towards body 20. In one or more embodiments, the reflective surface 220 may have an aspheric profile with symmetry features around axis X100.

In one or more embodiments, mirror 22 may perform the function of directing/collimating (by means of surface 220) the light radiation backwards to the filament-like body 20, so as to facilitate the reflection, onto surfaces 200 of body 20, (also) of the light radiation which, coming from light 18, has not previously been reflected on such reflective surfaces.

In one or more embodiments, the mirror 22 may act as a front shield of device 100, so as to contribute to a front cut-off action as required by regulations. In one or more embodiments, mirror 22 may therefore include a generally opaque material, on the basis of the reflectivity of the mirror surface 220 facing towards body 20.

In one or more embodiments, the assembly of the components exemplified in FIGS. 1 and 2 may be arranged inside a light-permeable shell, having e.g. a tubular shape, adapted to protect the lighting device during storage and installation, e.g. extending to connect the outer portion of the light radiation source 12 and the outer portion of the distal mirror 22, so as to support the various components of the device in the correct position.

This shell is not visible in FIGS. 1 and 2, but it is schematically shown in dashed lines in FIG. 3.

The latter figure exemplifies the possibility of using a lighting device 100 according to one or more embodiments in order to implement a light 1000 for a vehicle (e.g. a headlamp for a motor vehicle).

Light 1000 may include, as known per se, an accommodating casing C wherein one or more lighting devices 100 may be mounted, e.g. by fitting into a corresponding reflector R, the casing including at least one light-permeable portion (e.g. a transparent portion, optionally having the shape of a lens) for emitting the light radiation coming from the source 12 of the lighting device.

One or more embodiments may therefore concern a lighting device (e.g. 100), including:
 an electrically-powered light radiation source (e.g. 12),
 a beam-narrowing optical system (e.g. 14) facing the light radiation source, for propagating a narrowed light radiation beam from said source along a longitudinal axis (e.g. X100) of the device, and arranged distally of the beam-narrowing optical system along said longitudinal axis, a cascaded arrangement of:
  a light-condensing lens (e.g. 16),
  a light-driving lens (e.g. 18),
  a filament-like body (e.g. 20) including a plurality of annular reflective surfaces (e.g. 200) extending around said optical axis and exposed to the light radiation of the light radiation source propagated through the light-condensing lens and the light-driving lens,
  a distal mirror member (e.g. 22) having a reflective surface (e.g. 220) facing towards the filament-like body, to reflect light radiation towards annular reflective surfaces in said plurality of annular reflective surfaces,
 so that the light radiation reflected by the annular reflective surfaces of the filament-like body is spread radially from the longitudinal axis of the device.

In one or more embodiments, the beam-narrowing optical system may include at least one planar-convex lens (e.g. 140) having the planar surface facing towards the light radiation source.

One or more embodiments may include a gap between the light radiation source and the beam-narrowing optical system.

In one or more embodiments, the light radiation source may include an array of light-emitting elements (e.g. 120).

In one or more embodiments, the beam-narrowing optical system may include an array of optical elements (e.g. 140) coupled with respective light-emitting elements of the light radiation source.

In one or more embodiments, the light-emitting elements in said array of light-emitting elements may be offset with respect to said longitudinal axis, so that the light radiation coming from each said light-emitting element is directed partly towards the filament-like body and partly towards the distal mirror member.

In one or more embodiments, the light-condensing lens may include:
 an aspheric lens, and/or
 a convex surface (e.g. 160) facing towards the beam-narrowing optical system, and a concave surface (e.g. 162) facing towards the light-driving lens.

In one or more embodiments, the light-driving lens may include:
 a convex surface (e.g. 180) facing towards the light condensing lens,
 a tapered surface (e.g. 182) facing towards, and preferably carrying, the filament-like body.

In one or more embodiments, the filament-like body may include a spindle-like body having said annular reflective surfaces staggered along the length thereof, said annular reflective surfaces preferably adjoining each other.

In one or more embodiments, said distal mirror member may include a body which provides a shield for countering light propagation along said longitudinal axis distally of the mirror member.

In one or more embodiments, the light radiation source may include at least one LED source, preferably with blue emission and phosphor conversion to visible light.

One or more embodiments may concern a light (e.g. a vehicle headlamp, 1000) including:
 a lighting device according to one or more embodiments, and
 a casing (e.g. C) for said lighting device, said casing including at least one light-permeable portion for emitting light radiation from the lighting device.

In one or more embodiments, a method of providing a lighting device may include:
 providing an electrically-powered light radiation source,
 arranging a beam-narrowing optical system facing the light radiation source, for propagating a narrowed light radiation beam from said source along a longitudinal axis of the device, and arranging distally of the beam-narrowing optical system along said longitudinal axis a cascaded arrangement of:
  a light-condensing lens,
  a light-driving lens,
  a filament-like body including a plurality of annular reflective surfaces extending around said longitudinal axis and exposed to the light radiation of the light radiation source propagated through the light-condensing lens and the light-driving lens,
  a distal mirror member having a reflective surface facing towards the filament-like body, to reflect light radiation towards annular reflective surfaces in said plurality of annular reflective surfaces, so that the light radiation reflected by the annular reflective surfaces of the filament-like body is spread radially from the longitudinal axis of the device.

Without prejudice to the basic principles, the implementation details and the embodiments may vary, even appreciably, with respect to what has been described herein by way of non-limiting example only, without departing from the extent of protection.

The extent of protection is defined by the annexed claims.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A lighting device, comprising:
   an electrically-powered light radiation source,
   a beam-narrowing optical system facing the light radiation source and propagating a narrowed light radiation beam from said source along a longitudinal axis of the device, and
   arranged distally of the beam-narrowing optical system along said longitudinal axis, a cascaded arrangement of:
      a light-condensing lens,
      a light-driving lens,
      a filament-like body including a plurality of annular reflective surfaces extending around said optical axis and exposed to light radiation of the light radiation source propagated through the light-condensing lens and the light-driving lens,
      a distal mirror member having a reflective surface towards the filament-like body to reflect light radiation towards annular reflective surfaces in said plurality of annular reflective surfaces,
   wherein light radiation reflected by the annular reflective surfaces of the filament-like body is spread radially outwardly of the longitudinal axis of the device.

2. The lighting device of claim 1, wherein the a beam-narrowing optical system includes at least one planar-convex lens having the planar surface towards the light radiation source.

3. The lighting device of claim 1, including a gap between the light radiation source and the beam-narrowing optical system.

4. The lighting device of claim 1, wherein the light radiation source includes an array of light-emitting elements.

5. The lighting device of claim 4, wherein the beam-narrowing optical system includes an array of optical elements coupled with respective light-emitting elements of the light radiation source.

6. The lighting device of claim 4, wherein the light-emitting elements of the light radiation source are offset with respect to said longitudinal axis, wherein light radiation from each light-emitting element is directed partly towards the filament-like body and partly towards the distal mirror member.

7. The lighting device of claim 1, wherein the light-condensing lens includes:
   an aspheric lens, and/or
   a convex surface towards the beam-narrowing optical system and a concave surface towards the light-driving lens.

8. The lighting device of claim 1, wherein the light-driving lens includes:
   a convex surface towards the light condensing lens,
   a tapered surface towards, and preferably carrying, the filament-like body.

9. The lighting device claim 1, wherein the filament-like body includes a spindle-like body having said annular reflective surfaces staggered along the length thereof, said annular reflective surfaces preferably adjoining to each other.

10. The lighting device claim 1, wherein said distal mirror member includes a body which provides a shield for countering light propagation along said longitudinal axis distally of the mirror member.

11. The lighting device of claim 1, wherein the light radiation source includes at least one LED source, preferably with blue emission and phosphor conversion to visible light.

12. A light comprising:
   a lighting device, wherein the lighting device comprises:
      an electrically-powered light radiation source,
      a beam-narrowing optical system facing the light radiation source and propagating a narrowed light radiation beam from said source along a longitudinal axis of the device, and
      arranged distally of the beam-narrowing optical system along said longitudinal axis, a cascaded arrangement of:
         a light-condensing lens,
         a light-driving lens,
         a filament-like body including a plurality of annular reflective surfaces extending around said optical axis and exposed to light radiation of the light radiation source propagated through the light-condensing lens and the light-driving lens,
         a distal mirror member having a reflective surface towards the filament-like body to reflect light radiation towards annular reflective surfaces in said plurality of annular reflective surfaces,
      wherein light radiation reflected by the annular reflective surfaces of the filament-like body is spread radially outwardly of the longitudinal axis of the device; and
   a casing for said lighting device, said casing including at least one light-permeable portion for emitting light radiation from the lighting device.

13. A method of providing a lighting device, the method comprising:
   providing an electrically-powered light radiation source,
   arranging a beam-narrowing optical system facing the light radiation source and propagating a narrowed light radiation beam from said source along a longitudinal axis of the device, and
   arranging distally of the beam-narrowing optical system along said longitudinal axis, a cascaded arrangement of:
      a light-condensing lens,
      a light-driving lens,
      a filament-like body including a plurality of annular reflective surfaces extending around said optical axis and exposed to light radiation of the light radiation source propagated through the light-condensing lens and the light-driving lens,
      a distal mirror member having a reflective surface towards the filament-like body to reflect light radiation towards annular reflective surfaces in said plurality of annular reflective surfaces,
   wherein light radiation reflected by the annular reflective surfaces of the filament-like body is spread radially outwardly of the longitudinal axis of the device.

* * * * *